Patented Sept. 20, 1927.

1,642,689

UNITED STATES PATENT OFFICE.

MARTIN MUGDAN AND JOSEPH WIMMER, OF MUNICH, GERMANY, ASSIGNORS TO CONSORTIUM FUR ELEKTROCHEMISCHE INDUSTRIE, OF MUNICH, GERMANY.

METHOD OF PREPARATION OF METHYL FORMATE.

No Drawing. Application filed January 22, 1926, Serial No. 83,110, and in Germany January 22, 1925.

The object of this invention is the preparation of methyl formate from formaldehyde.

It is known that aldehydes, in the presence of alkali compounds or alcoholates, can be changed to acids and alcohol or into esters. In the case of formaldehyde the reaction to acid and alcohol goes so easily that a quantitative method of determination is based thereon, in this case the ester is not formed.

We have now discovered that substantially water-free formaldehyde can be converted quickly and directly into the ester, methyl formate. This reaction, we have found, will go on if formaldehyde vapor is heated in the presence of finely divided metals. In carrying out the process formaldehyde vapor is conducted into contact with heated finely divided metal, copper for example. As a source of dry formaldehyde we have found it preferable to use the common polymerized form known as paraformaldehyde, which on heating will give off formaldehyde.

*Example.*

Paraformaldehyde is heated and an indifferent gas passed over it to pick up the evolved formaldehyde. The vapors are now led over a catalyst composed of pumice with finely divided copper in its pores. This catalyst is produced by impregnating the pumice with a soluble copper salt, precipitating copper oxide therefrom, washing and reducing the copper oxide at fairly low temperatures. This catalyst is placed in a tube and heated above 100° C., preferably to about 120° C. As soon as the formaldehyde vapor comes into contact with the catalyst a strongly exothermic reaction sets in; the heat of reaction is dissipated by cooling the reaction tube. A temperature of about 150° C. is maintained. The heat of reaction can also be dissipated and any injurious effects of relatively high temperatures avoided by using a large amount of diluent gas. This diluent can be the vapors of some previously prepared methyl formate. The methyl formate in the exit gas is now collected by cooling and condensation. The purity is very high. We have found that very little decomposition of methyl formate occurs below 250° C.

We have found that other metals such as iron, nickel, gold, etc., will serve to effect the formation of methyl formate from formaldehyde so we do not wish to be restricted to the specific metals mentioned.

We have also found that if paraformaldehyde is mixed with a catalyst consisting of an easily reducible metal salt and then heated in an autoclave to the reaction temperature methyl formate is also formed. To moderate this type of reaction we have found it advisable to use formaldehyde or paraformaldehyde mixed with an indifferent liquid such as, for example, methyl formate.

What we claim is:

1. Process for the production of methyl formate which consists in heating formaldehyde in contact with a finely divided metal.

2. Process for the production of methyl formate which consists in mixing formaldehyde vapor with an indifferent gas and heating the mixture in contact with a finely divided metal.

3. Process for the production of methyl formate which consists in passing vapors of formaldehyde in contact with a finely divided metal heated to a temperature between 100° C. and 250° C.

4. Process for the production of methyl formate which consists in passing vapors of formaldehyde in contact with a finely divided copper heated to a temperature between 100° C. and 250° C.

5. Process for the production of methyl formate which consists in heating formaldehyde in contact with finely divided copper.

6. Process for the production of methyl formate which consists in passing vapors of formaldehyde in contact with finely divided copper heated to about 150° C.

7. Process for the production of methyl formate which consists in mixing formaldehyde vapor with an indifferent gas and heating the mixture in contact with finely divided copper.

8. Process for the production of methyl formate which consists in mixing formaldehyde vapor with an indifferent gas and heating the mixture in contact with finely divided copper at a temperature between 100° C. and 250° C.

9. Process for the production of methyl formate which consists in mixing formaldehyde vapor with vapors of methyl formate and heating the mixture in contact with finely divided copper.

10. Process for the production of methyl formate which consists in mixing formaldehyde vapor with vapors of methyl formate and contacting the mixture with finely divided copper heated to a temperature between 100° C. and 250° C.

Dr. MARTIN MUGDAN.
Dr. JOSEPH WIMMER.